(12) United States Patent
Sakashita et al.

(10) Patent No.: US 7,314,123 B2
(45) Date of Patent: Jan. 1, 2008

(54) PARKING BRAKE EQUALIZER

(75) Inventors: Yasuhisa Sakashita, Toyota (JP);
Takumi Uno, Toyota (JP); Toshiro Takeshima, Toyota (JP); Masayuki Shimizu, Toyota (JP); Takuya Inaba, Chiryu (JP)

(73) Assignees: Toyota Iron Works Co, Ltd., Toyota-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 264 days.

(21) Appl. No.: 11/119,752

(22) Filed: May 3, 2005

(65) Prior Publication Data

US 2006/0169552 A1 Aug. 3, 2006

(30) Foreign Application Priority Data

Jan. 31, 2005 (JP) .............................. 2005-023352

(51) Int. Cl.
*F16D 65/14* (2006.01)

(52) U.S. Cl. .................................. 188/204 R; 188/2 D

(58) Field of Classification Search ................ 188/2 A, 188/2 D, 204 R, 265, 204 A; 74/501.5 R, 74/502.6, 502.4

See application file for complete search history.

(56) References Cited

U.S. PATENT DOCUMENTS

| 5,138,898 A * | 8/1992 | Pospisil et al. ............ 74/502.6 |
| 5,219,044 A | 6/1993 | Siring |
| 2007/0151811 A1 * | 7/2007 | Herman et al. ............. 188/2 D |

FOREIGN PATENT DOCUMENTS

| DE | 37 41 529 A1 | 6/1989 |
| EP | 1669268 A1 * | 6/2006 |
| JP | S59-132460 U | 9/1984 |
| JP | 02-092759 | 4/1990 |
| JP | H2-92759 A | 4/1990 |
| JP | 05016790 A * | 1/1993 |
| JP | H7-8135 U | 2/1995 |

* cited by examiner

*Primary Examiner*—Thomas Williams
(74) *Attorney, Agent, or Firm*—Finnegan, Henderson, Farabow, Garrett & Dunner, LLP

(57) ABSTRACT

A parking brake equalizer includes: a main body including side plates and a back plate to have a U shape, and accommodating output members; and a resin member disposed within the main body. The main body has engaging holes provided in the back plate, allowing connecting members connecting the output members and braking devices to extend outwardly of the main body while inhibiting the output members from passing therethrough; inserting holes provided in one of the side plates such that the output members are insertable into the main body therethrough; and slits provided to connect the inserting and engaging holes, for enabling the connecting members to be insertable therethrough. The resin member includes contact-preventing portions preventing contact of the output members with the side plates and gate portions projecting within the inserting holes and elastically deformable to allow insertion of the output members therethrough, while restoring their original shapes to prevent the output members from coming out through the inserting holes after the output members have been seated in the engaging holes.

5 Claims, 5 Drawing Sheets

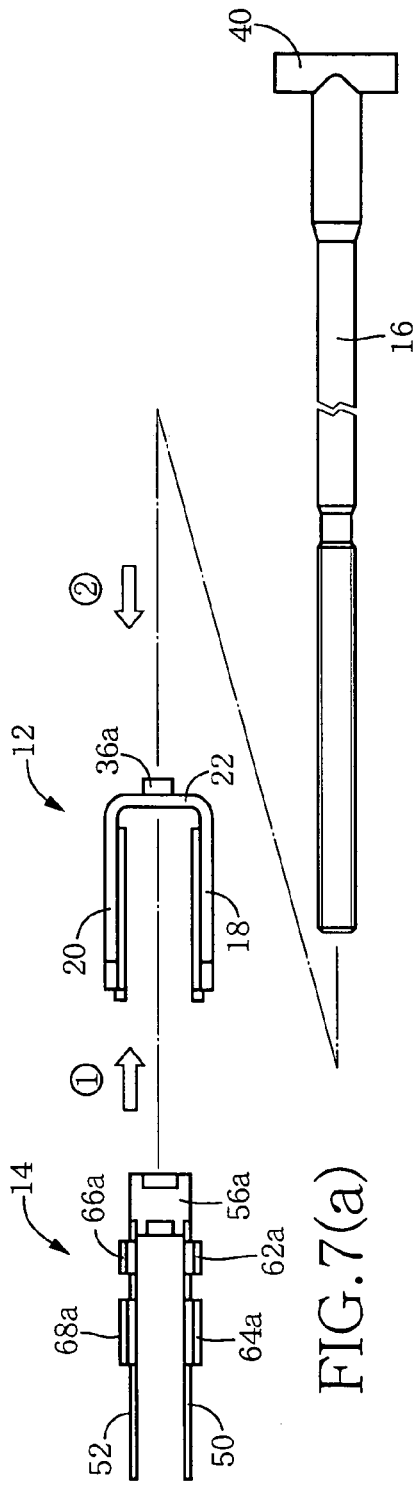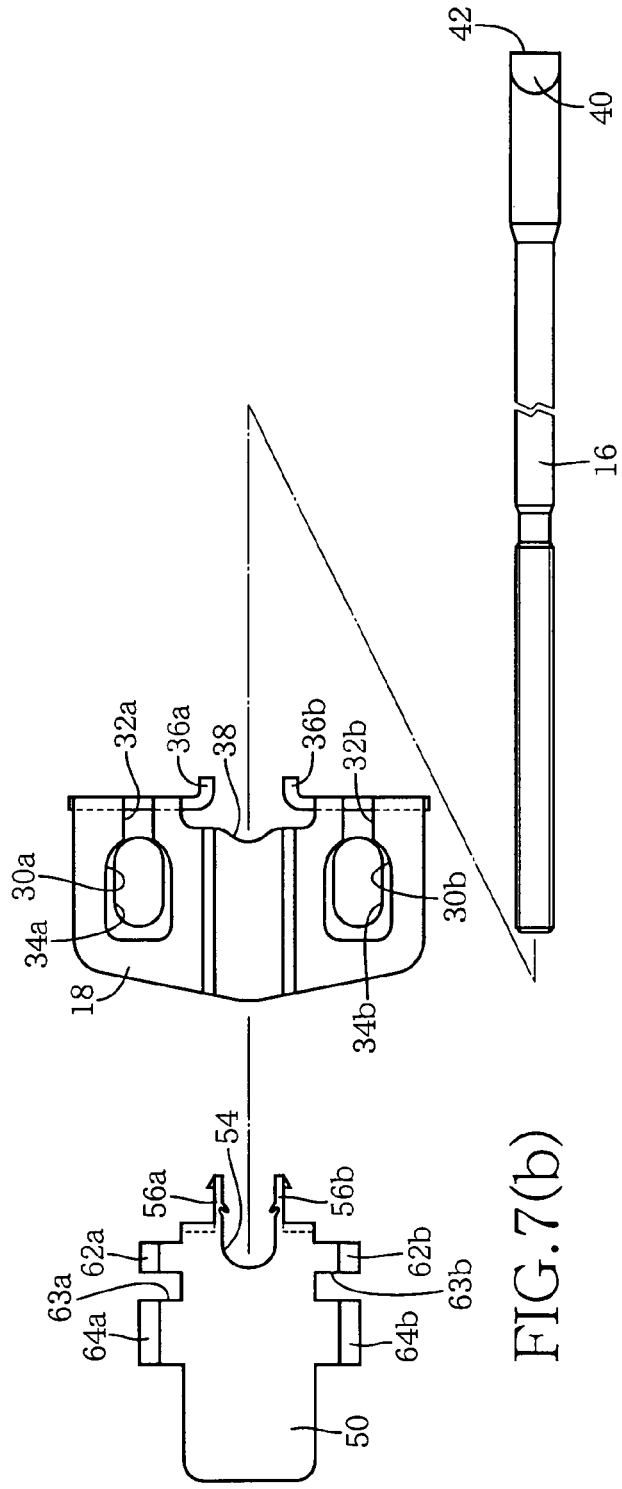

PARKING BRAKE EQUALIZER

BACKGROUND OF THE INVENTION

1. Field of the Invention

The present invention relates in general to a parking brake equalizer, and more particularly to an equalizer which facilitates an operation to fix therein output members connected to braking devices of a vehicle, and which satisfactorily prevents removal of the output members therefrom and generation of a noise.

2. Discussion of Prior Art

There is known a parking brake equalizer provided with a pair of engaging portions which are to be held in engagement with a pair of output members connected to braking devices of right and left wheels and which are disposed symmetrically on opposite sides of an input portion, such that the braking devices are activated, when the parking brake equalizer is caused to pull the pair of output members while being rockable about the input portion as a fulcrum, upon application of a tensile force to the input portion for activating a parking brake. As an example of such an equalizer, Patent Document 1 discloses a device constituted principally by a metallic main body which includes a pair of mutually parallel side plates and a back plate connecting the side plates, so as to have a substantially U shape. In the disclosed device, output members (cable ends) are held in engagement with engaging portions which are provided in respective opposite side portions of the main body, and each of the output members is prevented from being removed by a spring-steel made stopper which is attached to the main body.

Patent Document 1: JP-H2-92759A

However, in the conventional equalizer, since the output members have to be made to approach the main body from respective opposite sides of the main body, so as to be brought into engagement with the respective engaging portions, it is not necessarily easy to carry out an operation to bring the output members into engagement with the respective engaging portions. Further, in the conventional equalizer, there is a risk that a noise could be generated by contact between each output member and the stopper which are made of metallic materials during running of vehicle.

The present invention was made in the light of the background art discussed above. It is therefore an object of the invention to provide an equalizer which facilitates an operation to fix output members therein, and which satisfactorily prevents removal of the output members therefrom and generation of a noise.

SUMMARY OF THE INVENTION

For achieving the above object, the first invention provides a parking brake equalizer provided with a pair of engaging portions which are to be held in engagement with a pair of output members connected to braking devices of right and left wheels and which are disposed symmetrically on opposite sides of an input portion, such that the braking devices are activated, when the parking brake equalizer is caused to pull the pair of output members while being rockable about the input portion as a fulcrum, upon application of a tensile force to the input portion for activating a parking brake, the equalizer being characterized by being equipped with: (a) a metallic main body which includes a pair of mutually parallel side plates and a back plate connecting the side plates, so as to have a substantially U shape, and which accommodates the pair of output members in an inside of the U shape thereof, and (b) a synthetic resin member which is integrally disposed in the inside of the U shape of the main body, wherein (c) the main body has: (c-1) a pair of engaging holes which are provided in the back plate, and which allows connecting members connecting the output members and the braking devices, to extend outwardly of the main body, while inhibits the output members from passing therethrough; (c-2) a pair of inserting holes which are provided in one of the pair of side plates so as to correspond to the pair of engaging holes, such that the pair of output members are insertable to the inside of the U shape of the main body therethrough; and (c-3) a pair of slits which are provided to extend between the one of the pair of side plates and the back plate and to connect the inserting holes and the engaging holes, for enabling the connecting members to be insertable therethrough, wherein (c-4) portions of the back plate, in which the engaging holes are provided, serve as the engaging portions, and wherein (d) the synthetic resin member is integrally equipped with: (d-1) thin plate-like contact preventing portions which are interposed between the output members and the pair of side plates, so as to prevent contact of the output members with the side plates; and (d-2) a pair of gate portions which project within the pair of inserting holes, and which are elastically deformable to allow insertion of the output members therethrough, while restoring original shapes thereof to prevent the output members from coming out through the inserting holes, at least in a state in which the output members have been moved toward the back plate and seated in the engaging holes.

The second invention is, in the parking brake equalizer of the first invention, characterized in that a cutout is provided between each of the contact preventing portions and a corresponding one of the gate portions, such that each of the gate portions is elastically deformable independently of a corresponding one of the contact preventing portions.

The third invention is, in the parking brake equalizer of the second invention, characterized in that each of the gate portions projecting within a corresponding one of the inserting holes has a distal end portion which is bent toward the inside of the U shape in a direction of insertion of a corresponding one of the output members into a corresponding one of the inserting holes.

The fourth invention is, in the parking brake equalizer of any one the first through third inventions, characterized in that (a) the back plate of the main body is cutout in a central portion thereof between the pair of engaging holes, while each of the pair of side plates is provided with a recess as the input portion, (b) wherein a T-shaped head portion provided by an end portion of a pull rod receiving the tensile force is held in engagement with the recess, while the pull rod is arranged to project out through an opening of the U shape of the main body, and (c) wherein the synthetic resin member has a U shape conforming to the U shape of the main body, and is provided with mutually parallel flat plate portions which are interposed between the pair of side plates of the main body and the pull rod.

The fifth invention is, in the parking brake equalizer of the fourth invention, characterized in that (a) the synthetic resin member is equipped with a pair of mutually parallel positioning plate portions positioning the head portion of the pull rod within the recess, (b) wherein each of the positioning plate portions is integrally provided with an engaging pawl which projects inwardly therefrom, and which is elastically deformable to allow passage of the head portion toward the recess, while restoring an original shape thereof to inhibit movement of the head portion in an opposite direction causing the head portion to come out of the recess after the head portion has been brought into contact with the recess.

In the parking brake equalizer constructed as described above in which the pair of inserting holes are provided in the one of the side plates of the main body, the pair of output members are inserted into the respective inserting holes by causing the gate portions of the synthetic resin member to be elastically deformed, while the connecting members extending from the respective output members are inserted into the respective slits. Then, the output members can be seated in the engaging holes, by relatively moving the output members and the connecting members toward the back plate of the main body. Therefore, by pressing the equalizer against the output members which, for example, project out from a floor of the vehicle in substantially parallel with each other, the output members can be simultaneously inserted into the respective inserting holes, so as to be fixed in the equalizer. That is, the present equalizer facilitates an operation to fix the output members therein.

Further, in a stage after the output members have been moved toward the back plate of the main body and then seated in the respective engaging holes, the gate portions restore their original shapes, so that the output members are prevented from coming out of the respective inserting holes. Thus, simply by inserting the output members into the respective inserting holes while causing the gate portions to be elastically deformed, the engagement of the output members with the equalizer can be satisfactorily maintained, whereby the operation to fix the output members therein is made easier.

Further, the gate portions provided to inhibit removal of the output members are made of synthetic resin, and the contact preventing portions made of synthetic resin are interposed between the pair of the side plates of the main body and the output members, so that it is possible to satisfactorily prevent generation of a noise arising from contact between the metallic components during running of vehicle.

In the second invention, the cutout is provided between each contact preventing portion and the corresponding gate portion, such that each gate portion is elastically deformable independently of the corresponding contact preventing portion. This arrangement permits each gate portion to be deformable with a higher degree of freedom, than in an arrangement in which each contact preventing portion and the corresponding gate portion are integrally provided to be contiguous to each other. That is, this arrangement permits the output members to be easily inserted into the respective inserting holes, and also permits each contact preventing portion and the corresponding gate portion to be designed with respect to, for example, their cross sectional shapes and dimensions, independently of each other depending upon their own functions. For example, where the distal end portion of each gate portion is bent toward the inside of the main body, as in the third invention, an amount of the deformation of each gate portion, upon insertion of the corresponding output member into the corresponding inserting hole, can be reduced, whereby the insertion can be made with a reduced pressing force, thereby further facilitating the operation to fix the output members into the equalizer.

In the fourth invention, the pull rod transmitting the tensile force for activating the parking brake is connected to the equalizer, and the pull rod is arranged to pass through the inside of the U-shape of the main body and project out from the opening of the main body. Further, the synthetic resin member is bent to have the U shape conforming to the U shape of the main body, and is provided with the mutually parallel flat plate portions which are interposed between the pair of side plates of the main body and the pull rod, thereby making it possible to prevent contact between each side plate and the pull rod which are made of metallic materials and to accordingly satisfactorily prevent generation of a noise arising from the contact between the metallic components during running of the vehicle.

In the fifth invention, the synthetic resin member is integrally provided with the pair of mutually parallel positioning plate portions for positioning the T-shaped head portion of the pull rod within the recess (input portion), and each of the positioning plate portions is integrally provided with the engaging pawl for inhibiting the head portion from coming out of the recess. Thus, simply by inserting the head portion into a space between the pair of positioning plate portions while causing the engaging pawl to be elastically deformed, the engagement of the pull rod with the equalizer can be satisfactorily maintained, whereby the operation to fix the pull rod in the equalizer is made easier.

The main body of the equalizer is preferably produced by bending, punching and/or other press work performed on a metallic sheet material. The synthetic resin member is preferably arranged to permit itself to be unremovably fixed to the main body just by one-touch operation, for example, with engagement of its elastically deformable engager such as stop pawl with the main body, which engagement can be made by inserting the synthetic resin member into the inside of the U shape of the main body through the opening of the main body.

The pair of side plates of the U-shaped main body do not necessarily have to be identical in shape with each other. While the one of the side plates is provided with the inserting holes and slits, the other of the side plates may have any one of various shapes. For example, the other side plate may have an aperture only in its central portion in which the pull rod is located.

The recess functioning as the input portion and the T-shaped head portion of the pull rod are held in engagement at their engaged portions with each other. For enabling a smooth rocking motion, each of the engaged portions preferably has an arcuate shape. The T-shaped head portion may have a columnar shape. However, where the T-shaped head portion is held in engagement with the engaging pawls of the synthetic resin member, as in the fifth invention, the T-shaped head portion preferably has a flat surface at its portion at which the head portion is held in engagement with the engaging pawls of the synthetic resin member. In this case, the head portion is adapted to have a semi-columnar shape as a whole and a semi-circular shape in its cross section, for example.

While the cutout is provided between each contact preventing portions and the corresponding gate portion in the second invention, the first invention may be embodied such that each contact preventing portions and the corresponding gate portion are adapted to be contiguous without the cutout therebetween. The cutout may take any one of various forms such as a notch-shaped one, as long as the cutout is capable of enabling the gate portion to be independently and freely deformable with or without presence of the contact preventing portion.

Each of the gate portions may be adapted to immediately restore its original shape as a result of displacement of the gate portion toward its distal end which takes place after the insertion of the corresponding output member into the corresponding inserting hole, or may be adapted to restore its original shape as a result of disengagement of the gate portion from the corresponding output member which takes place upon movement of the output member toward the back plate of the main body, as long as the gate portion restores its original shape in a manner preventing the corresponding output member from coming out through the corresponding inserting hole at least in a state in which the output member has been seated in the corresponding engaging hole.

Each of the output members can be prevented from coming out through the corresponding inserting hole, for example, by an arrangement in which the corresponding gate portion is arranged to close a part or entirety of the corresponding inserting hole. However, where the distal end portion of each of the gate portions is bent toward the inside of the U-shape of the main body, as in the third invention, the corresponding output member can be prevented from coming out through the corresponding inserting hole, owing to abutting contact of the output member with the gate portion which takes place when the output member is moved backward (moved in a direction away from the corresponding engaging hole), owing to the arrangement in which further backward movement of the output member is inhibited by the distal end portion of the gate portion.

While each of the side plates is provided with the recess as the input portion in the fourth and fifth inventions, the input portion may take any one of various forms such as a circular hole to which a columnar-shaped input member is connected pivotably about its axis.

To the input portion, there may be connected a metallic pull rod or cable which is mechanically connected to a parking brake operating device (such as a lever and a pedal). Further, the invention is applicable also to an arrangement in which the tensile force is electrically generated by, for example, an electric motor.

Each of the output members may be provided by, for example, a metallic cable end having a columnar or spherical shape and coaxially connected to an end portion of a parking brake cable. However, each of the connecting members connected to the corresponding braking device is not necessarily limited to a cable but may be a link. A portion of each output member, at which the output member is seated in the corresponding engaging hole, is preferably adapted to have an arcuate or spherical shape for enabling a rocking motion of the output member.

BRIEF DESCRIPTION OF THE DRAWINGS

FIG. 7(a) is a front view corresponding to FIG. 1 and showing the equalizer of FIG. 1 in an exploded manner.

FIG. 7(b) is a bottom view corresponding to FIG. 2 and showing the equalizer of FIG. 1 in an exploded manner.

DETAILED DESCRIPTION OF THE INVENTION

There will be described in detail an embodiment of the present invention, with reference to the drawings.

Figure 1:
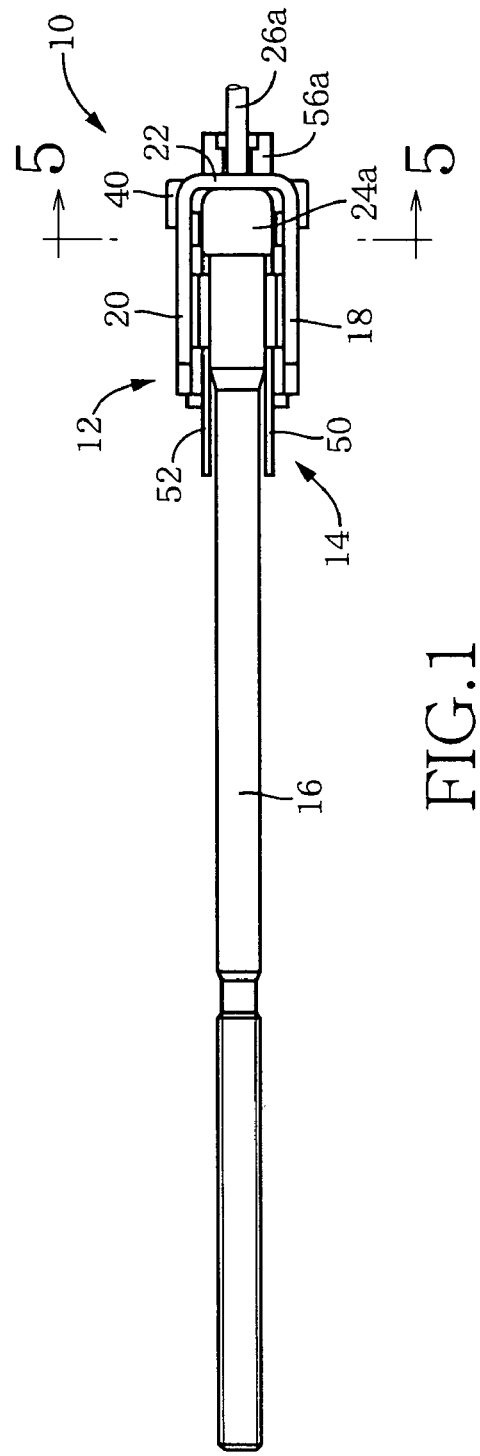
FIG. 1 is a front view showing an assembled state of a parking brake equalizer which is an embodiment of the present invention.
Figure 2:
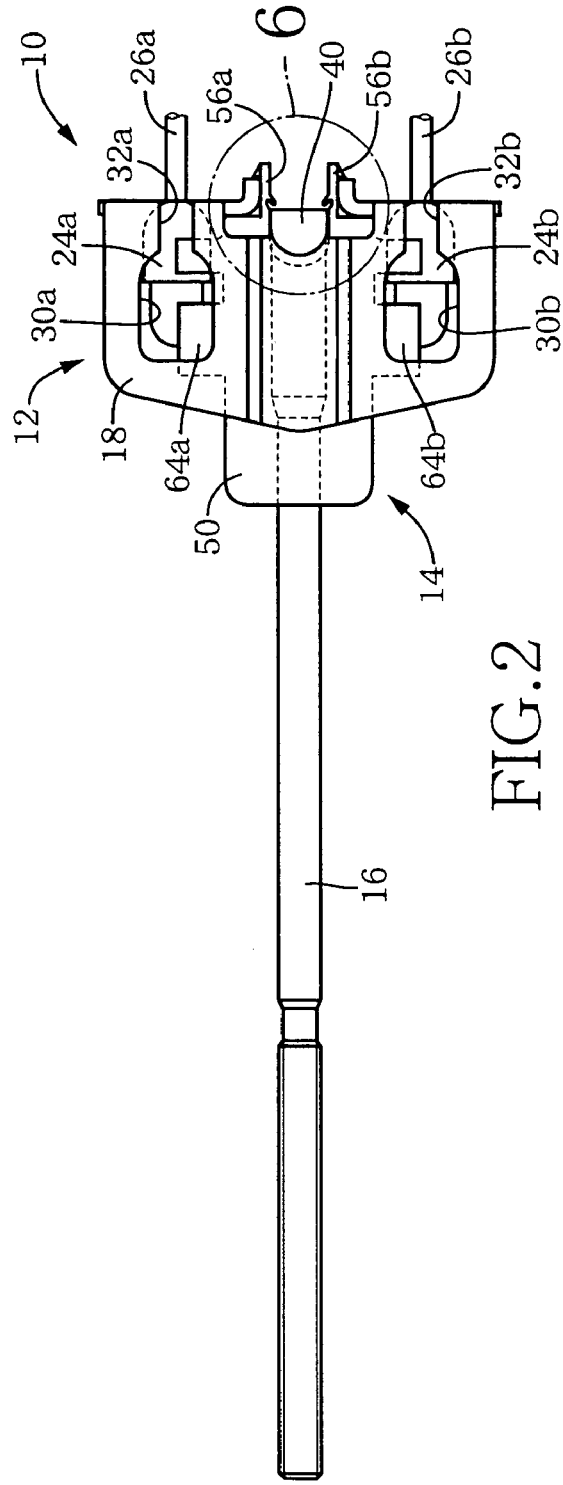
FIG. 2 is a bottom view of the equalizer of FIG. 1.
Figure 3:
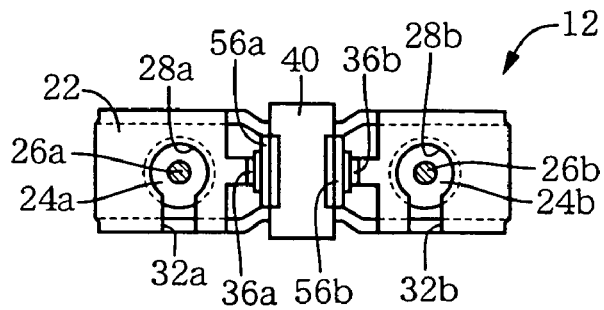
FIG. 3 is a right side view of the equalizer of FIG. 1.
Figure 4:
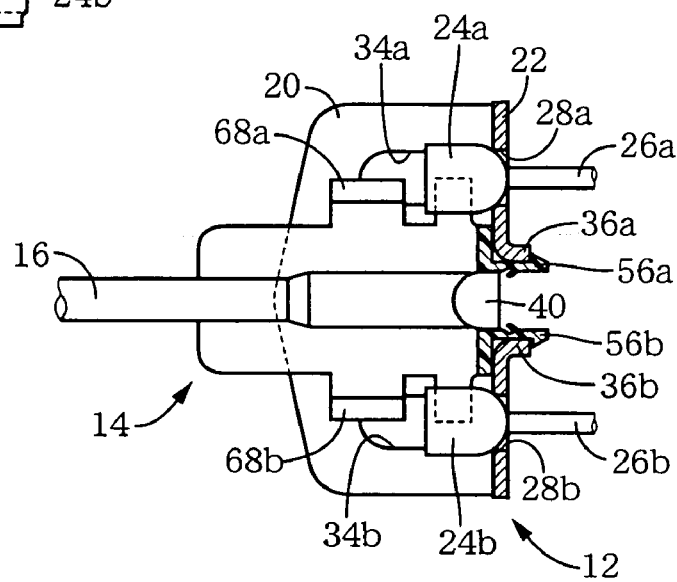
FIG. 4 is a cross sectional view of the equalizer of FIG. 1, with removal of a lower plate which is located on a front side as seen in FIG. 2.
Figure 5:
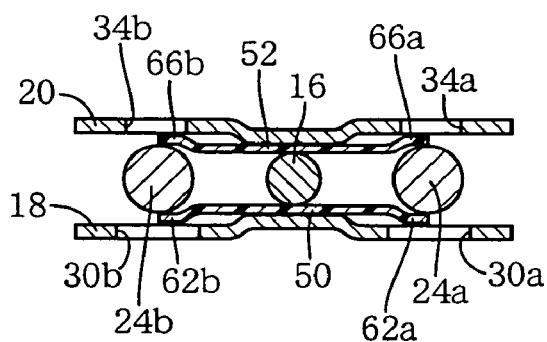
FIG. 5 is a cross sectional view taken along line 5-5 of FIG. 1.
Figure 6:
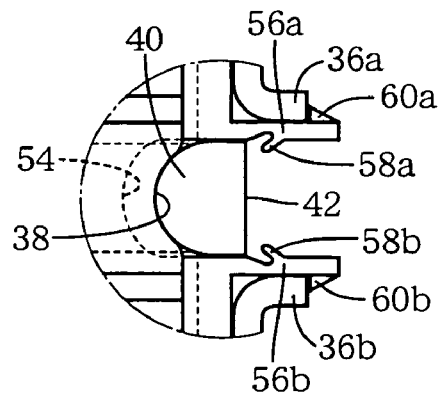
FIG. 6 is a view in enlargement of portion 6 of FIG. 2.

FIG. 1 and FIG. 2 are a front view and a bottom view of an equalizer 10 which is an embodiment of the present invention, respectively. FIG. 3 is a right side view as seen from a right side of FIG. 1, i.e., from a side of the parking brake cables 26a, 26b. FIG. 4 is a cross sectional view with removal of a lower plate 18 which is located on a front side as seen in FIG. 2. FIG. 5 is a cross sectional view taken along line 5-5 of FIG. 1. FIG. 6 is a view in enlargement of portion 6 of FIG. 2. FIG. 7 is a set of views showing, in an exploded manner, a main body 12, a synthetic resin member 14 and a pull rod 16 which constitute the equalizer 10, wherein FIG. 7(a) and FIG. 7(b) are a front view and a bottom view, respectively, with circled numbers indicating an order according to which an assembling operation is to be carried out.

Figure 8:
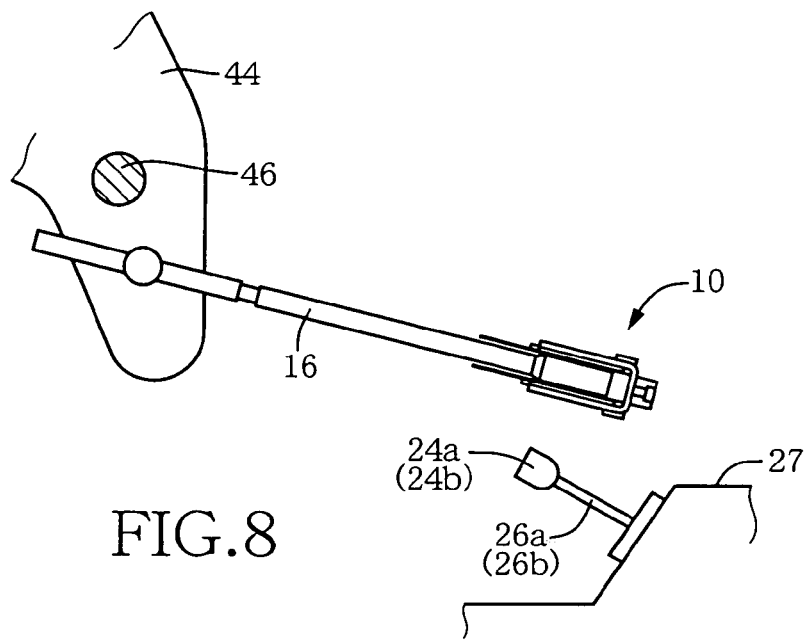
FIG. 8 is a view explaining an operation to connect the equalizer of FIG. 1 to a parking brake cable.

The equalizer 10 is equipped with the metallic main body 12 and the synthetic resin member 14 which is integrally formed of a synthetic resin. The main body 12 has a pair of mutually parallel plates in the form of the lower and upper plates 18, 20 having substantially the same shapes, and a back plate 22 connecting the lower and upper plates 18, 20 which are integral with the back plate 22. The main body 12 has a U shape as seen in its front view as shown in FIGS. 1 and 7(a), and is produced by, for example, bending, punching and/or other press work performed on a metallic sheet material. Output members in the form of cable ends 24a, 24b are accommodated in an inside of the U shape of the main body 12, while taking horizontal postures. To the respective cable ends 24a, 24b, there are connected the parking brake cables 26a, 26b, which are connected to braking devices of wheels. The parking brake cables 26a, 26b correspond to connecting members, and are introduced into a passengers' compartment of a vehicle through a floor 27, as shown in FIG. 8. The introduced cables 26a, 26b are connected to the equalizer 10 through the cable ends 24a, 24b which are coaxially attached to end portions of the cables 26a, 26b.

In the back plate 22 of the main body 12, as is apparent from FIGS. 3 and 4, a pair of engaging holes 28a, 28b are provided in positions substantially symmetrical with respect to a centerline of the back plate 22. The parking brake cables 26a, 26b extend through the respective engaging holes 28a, 28b outwardly of the main body 12. Each of the engaging holes 28a, 28b has a diameter smaller than that of a corresponding one of the cable ends 24a, 24b having a columnar shape, so that the cable ends 24a, 24b can not come out from the inside of the U shape of the main body 12 through the respective engaging holes 28a, 28b while being seated in the engaging holes 28a, 28b. Each of the cable ends 24a, 24b has a spherical-shaped end portion at which each cable end 24a, 24b is connected to the corresponding parking brake cable 26a, 26b, so that each cable end 24a, 24b is rockably seated in the corresponding engaging hole 28a, 28b. Portions of the back plate 22 in which the engaging holes 28a, 28b are provided, namely, in which the cable ends 24a, 24b are seated, correspond to engaging portions.

In the lower plate 18 of the main body 12, as is apparent from FIGS. 2 and 7(b), a pair of inserting holes 30a, 30b are provided in positions corresponding to the pair of engaging holes 28a, 28b, specifically, in positions symmetrical with respect to a centerline of the lower plate 18 which are spaced apart from each other by a spacing distance equal to a spacing distance between the engaging holes 28a, 28b, so that the pair of cable ends 24a, 24b are insertable to the inside of the U-shaped main body 12 through the respective inserting holes 30a, 30b. Further, a pair of slits 32a, 32b are provided to extend between the lower plate 18 and the back plate 22 in parallel to the centerlines of the lower and back plates 18, 22 and to connect the inserting holes 30a, 30b and the engaging holes 28a, 28b, for enabling the parking brake cables 26a, 26b to be inserted to the inside of the main body 12 through the respective slits 32a, 32b. In the upper plate 20, for reducing weight of the main body 12, blank holes 34a, 34b are provided in positions substantially same as those of the inserting holes 30a, 30b.

The back plate 22 of the main body 12 is cutout in its central portion between the pair of engaging holes 28a, 28b. That is, the back plate 22 has a vertically extending cutout portion in its center portion. In the cutout portion, there are provided a pair of substantially mutually parallel flanges 36a, 36b, each of which is formed by bending the back plate 22 at substantially a right angle so as to extend along the center line outwardly of the U shape of the main body 12 (rightwardly as seen in FIGS. 2 and 7(b)). Each of the lower and upper plates 18, 20 has a recess 38 as an input portion in its central portion corresponding to the cutout central portion of the back plate 22. A T-shaped head portion 40 provided by an end portion of the pull rod 16 is arranged to extend between the pair of recesses 38 to be held in engagement with the recesses 38, while the pull rod 16 is arranged to project out through an opening of the U shape of the main body 12. Each of the recesses 38 has an arcuate shape, while a portion of the head portion 40 to be in contact with the recesses 38 has an arcuate shape, so that the contact portion of the head portion 40 is rockably held in contact with the recesses 38. The head portion 40 has a flat surface 42 in a portion opposite to the contact portion contacted with the recesses 38. Thus, the head portion 40 has a semi-columnar shape whose cross section is of a semi-circle shape.

The pull rod 16 is mechanically connected to a parking brake operating lever 44, as shown in FIG. 8, so as to be moved leftwardly as seen in FIG. 8 when the parking brake operating lever 44 is operatively pivoted clockwise about a support shaft 46. The leftward movement of the pull rod 16 causes the equalizer 10 to be pulled leftward as seen in FIG. 8. Thus, the pulled equalizer 10 pulls the pair of parking brake cables 26a, 26b, while enabling the head portion 40 of the pull rod 16 to be rocked about a fulcrum in the form of recesses 38 with which the head portion 40 is held in engagement, thereby activating the braking devices of the right and left wheels with substantially the same braking force.

The synthetic resin member 14 is a thin-walled plate, and has a U shape as seen in its front view as shown in FIGS. 1 and 7(a). The synthetic resin member 14 is held in substantially close contact with and integrally fitted in the inside of the main body 12. A pair of flat plate portions 50, 52, which are upper and lower portions of the U-shape of the synthetic resin member 14, are interposed between the pair of lower and upper plates 18, 20 of the main body 12 and the pull rod 16. The pair of flat plate portions 50, 52 have respective end portions projecting outwardly from the main body 12, so that the synthetic resin member 14 can be integrally fixed to the main body 12, by insertion of the synthetic resin member 14 into the opening of the U shape of the main body 12, which insertion can be made by gripping the end portions of the flat plate portions 50, 52. Since the pull rod 16 has a diameter smaller than that of each of the cable ends 24a, 24b, the central portions of the lower and upper plates 18, 20 of the main body 12 are recessed toward each other, so that the pull rod 16 can be positioned in its position by the lower and upper plates 18, 20 through the pair of flat plate portions 50, 52 of the synthetic resin member 14. It is noted that the pull rod 16 is arranged to be rockable about the head portion 40 within a space defined by and between the flat plate portions 50, 52 while being positioned in its position by the lower and upper plates 18, 20.

In a bent portion (back portion) of the U shape of the synthetic resin member 14, a U-shaped clearance groove 54 is provided in a position corresponding to the recesses 38 of the lower and upper plates 18, 20, for avoiding interference of the synthetic resin member 14 with the head portion 40 of the pull rod 16. Further, in the bent portion of the U shape of the synthetic resin member 14, a pair of mutually parallel positioning plate portions 56a, 56b are provided to project along the flanges 36a, 36b, outwardly from the U shape of the synthetic resin member 14, so as to guide the head portion 40 of the pull rod 16 into the recesses 38 and position the head portion 40 within the recesses 38. The positioning plate portions 56a, 56b are integrally provided with engaging pawls 58a, 58b projecting inwardly therefrom, as is apparent from FIG. 6. When the head portion 40 is made to pass the engaging pawls 58a, 58b toward the recesses 38 so as to fix the pull rod 16 into the main body 12, the engaging pawls 58a, 58b are elastically deformed as a result of its engagement with the columnar-shaped portion of the head portion 40, and are pushed outwardly to allow the passage of the head portion 40. When the head portion 40 is brought into contact with the recesses 38, the engaging pawls 58a, 58b restore their original shapes, and are brought into engagement with the flat surface 42 of the head portion 40 to inhibit movement of the head portion 40 in an opposite direction (rightward direction as seen in FIG. 6) causing the head portion 40 to come out from the recesses 38. The positioning plate portions 56a, 56b have accommodating grooves provided to accommodate therein the respective engaging pawls 58a, 58b, so that the engaging pawls 58a, 58b can be elastically pushed into the respective accommodating grooves, for allowing the passage of the head portion 40.

The positioning plate portions 56a, 56b also have, in their distal end portions, stop pawls 60a, 60b projecting outwardly therefrom (in directions away from the centerline) and held in engagement with distal end edges of the respective flanges 36a, 36b. The synthetic resin member 14 is fixed into the main body 12, before the fixing of the pull rod 16 into the main body 12. When the positioning plate portions 56a, 56b are intended to be inserted into a space between the flanges 36a, 36b, the positioning plate portions 56a, 56b per se are elastically inwardly deformed as a result of engagement of the stop pawls 60a, 60b with the respective flanges 36a, 36b, so as to allow the insertion of the positioning plate portions 56a, 56b into the space. When each of the stop pawls 60a, 60b is made to project toward a side of a corresponding one of the distal end edges of the respective flanges 36a, 36b (right side of the corresponding one of the flanges 36a, 36b), the positioning plate portions 56a, 56b restore their states in which they are held in substantially parallel with each other, as shown in FIG. 6, and the stop pawls 60a, 60b are held in engagement with the distal end edges of the respective flanges 36a, 36b such that the synthetic resin member 14 can not come out from the inside of the U shape of the main body 12. That is, the synthetic resin member 14 can be integrally fixed into the main body 12 easily by one-touch operation, namely, simply inserting the synthetic resin member 14 into the opening of the U shape of the main body 12, wherein the insertion of the synthetic resin member 14 is made by gripping the distal end portions of the pair of flat plate portions 50, 52 of the synthetic resin member 14.

Further, in opposite side portions of the flat plate portion 50 which is one of the pair of flat plate portions 50, 52 of the synthetic resin member 14, there are provided contact preventing portions 62a, 62b and gate portions 64a, 64b. The contact preventing portions 62a, 62b and gate portions 64a, 64b are provided symmetrically with respect to the centerline and project outwardly. In opposite side portions of the other flat plate portion 52, there are provided contact preventing portions 66a, 66b. The contact preventing portions 66a, 66b are provided symmetrically with respect to the centerline and project outwardly. The contact preventing portions 62a, 62b, 66a, 66b are provided adjacent to the bent portion (back portion) of the U shape of the synthetic resin member 14, and project by respective distances permitting them to be interposed between the lower and upper plates 18, 20 and the cable ends 24a, 24b seated on the back plate 22 and to reach almost centers of the cable ends 24a, 24b, as is apparent from FIG. 5, for thereby preventing contact of the cable ends 24a, 24b with the plates 18, 20. Each of the contact preventing portions 62a, 62b of the flat plate portion 50 and a corresponding one of the contact preventing portions 66a, 66b of the flat plate portion 52 are spaced apart from each other by a distance which is dependent on the diameter of a corresponding one of the cable ends 24a, 24b.

With the equalizer 10 being assembled, the gate portions 64a, 64b of the flat plate portion 50 are positioned in positions substantially aligned with the respective inserting holes 30a, 30b, and project by respective distances permitting them to reach almost centers of the respective inserting holes 30a, 30b. When the cable ends 24a, 24b are intended to be inserted into the respective inserting holes 30a, 30b, the gate portions 64a, 64b are elastically deformed so as to allow the insertion of the cable ends 24a, 24b into the inserting holes 30a, 30b. When the cable ends 24a, 24b are seated in the respective engaging holes 28a, 28b, as shown in FIGS. 2 and 4, as a result of movement of the cable ends 24a, 24b toward the back plate 22, the gate portions 64a, 64b restore their original shapes and close portions of the respective inserting holes 30a, 30b, thereby inhibiting the cable ends 24a, 24b from moving in a direction away from the back plate 22 (in the leftward direction as seen in FIGS. 2 and 4) and from coming out through the respective inserting holes 30a, 30b. A point of time at which each of the gate portions 64a, 64b restores its original shape is not particularly limited. For example, each of the gate portions 64a, 64b may be adapted to immediately restore its original shape as a result of its displacement away from the centerline which takes place after the insertion of a corresponding one of the cable ends 24a, 24b into a corresponding one of the inserting holes 30a, 30b, or may be adapted to restore its original shape as a result of its disengagement from the corresponding cable end 24a, 24b which takes place upon movement of the corresponding cable end 24a, 24b toward the back plate 22.

The flat plate portion 50 provided with the gate portions 64a, 64b has a width smaller than a spacing distance between ends of the respective inserting holes 30a, 30b which are in proximity with each other, so that the inserting holes 30a, 30b are not closed by the flat plate portion 50. Further, the flat plate portion 50 has cutouts 63a, 63b provided between the gate portions 64a, 64b and the contact preventing portions 62a, 62b, so that each of the gate portions 64a, 64b is deformable independently of a corresponding one of the contact preventing portions 62a, 62b. Thus, the provision of the cutouts 63a, 63b facilitates the insertion of the cable ends 24a, 24b into the respective inserting holes 30a, 30b, which is made by deformation of the gate portions 64a, 64b. In the present embodiment, each of the gate portions 64a, 64b projects to reach almost the center of a corresponding one of the inserting holes 30a, 30b, namely, to close the corresponding inserting hole 30a, 30b by about one-half of its width. The inserting hole 30a, 30b may be closed by a value ranging from one-third of the width to two-thirds of the width, and is preferably closed by a value ranging from one-third of the width to one-half of the width.

The flat plate portion 52 opposite to the flat plate portion 50 is provided with projecting portions 68a, 68b which have the same shape as the gate portions 64a, 64b. Between the projecting portions 68a, 68b and the contact preventing portions 66a, 66b, there are provided cutouts which have the same shape as the cutouts 63a, 63b. Where the synthetic resin member 14 is inserted into the main body 12 with the flat plate portion 52 being positioned on side of the lower plate 18, the projecting portions 68a, 68b serve as gate portions. However, the projecting portions 68a, 68be may be omitted, so that the synthetic resin member 14 is fixed into the main body 12 always with the flat plate portion 50 being positioned on side of the lower plate 18.

In the parking brake equalizer 10 as described above, the pair of inserting holes 30a, 30b are provided in the lower plate 18 as one of the side plates of the main body 12, in parallel to each other. When the pair of parking brake cables 26a, 26b are connected to the equalizer 10, the pair of cable ends 24a, 24b are inserted into the respective inserting holes 30a, 30b, by causing the gate portions 64a, 64b of the synthetic resin member 14 to be elastically deformed, while the parking brake cables 26a, 26b extending from the respective cable ends 24a, 24b are inserted into the respective slits 32a, 32b. Then, the cable ends 24a, 24b can be seated in the respective engaging holes 28a, 28b, by relatively moving the cable ends 24a, 24b toward the back plate 22 of the main body 12, for example, by pulling the parking brake cables 26a, 26b. Thus, it is possible to easily and quickly carry out an operation to connect the parking brake cables 26a, 26b to the equalizer 10.

Described specifically, the equalizer 10, to which the pull rod 16 has been previously fixed, is connected to the parking brake operating lever 44 via the pull rod 16, as shown in FIG. 8. Then, the cable ends 24a, 24b, introduced into the passengers' compartment through the floor 27 of the vehicle, are inserted into the respective inserting holes 30a, 30b, so as to be connected to the equalizer 10. In this instance, since the inserting holes 30a, 30b are provided in the lower plate 18 of the main body 12 so as to be parallel to each other, the cable ends 24a, 24b can be simultaneously inserted into the respective inserting holes 30a, 30b to be easily fixed in the equalizer 10, by simply pressing the equalizer 10 against the cable ends 24a, 24b while the cable ends 24a, 24b are arranged in substantially parallel to each other.

Further, in a stage after the cable ends 24a, 24b have been moved toward the back plate 22 and then seated in the respective engaging holes 28a, 28b, the gate portions 64a, 64b of the synthetic resin member 14 restore their original shapes, so that the cable ends 24a, 24b are prevented from coming out of the respective inserting holes 30a, 30b. Thus, simply by inserting the cable ends 24a, 24b into the respective inserting holes 30a, 30b while causing the gate portions 64a, 64b to be elastically deformed, the engagement of the cable ends 24a, 24b with the equalizer 10 can be satisfactorily maintained, whereby the operation to fix the cable ends 24a, 24b therein is made easier.

Further, the gate portions 64a, 64b provided to inhibit removal of the cable ends 24a, 24b are made of synthetic resin, and the contact preventing portions 62a, 62b, 66a, 66b are interposed between the lower and upper plates 18, 20 of the main body 12 and the cable ends 24a, 24b, so that it is possible to satisfactorily restrain generation of a noise arising from contact between the metallic components due to, for example, vibrations during running of vehicle, even in event of removal of the cable ends 24a, 24b from the respective engaging holes 28a, 28b, which removal could be caused by expansion of the parking brake cables 26a, 26b.

In the present embodiment, the cutouts 63a, 63b are provided between the contact preventing portions 62a, 62b and the gate portions 64a, 64b, such that each of the gate portions 64a, 64b is elastically deformable independently of a corresponding one of the contact preventing portions 62a, 62b. This arrangement permits each gate portion 64a, 64b to be deformable with a higher degree of freedom, than in an arrangement in which each contact preventing portion 62a, 62b and the corresponding gate portion 64a, 64b are integrally provided to be contiguous to each other. That is, this arrangement permits the cable ends 24a, 24b to be easily inserted into the respective inserting holes 30a, 30b, and also permits each contact preventing portion 62a, 62b and the corresponding gate portion 64a, 64b to be designed with respect to, for example, their cross sectional shapes and dimensions, independently of each other depending upon their own functions. For example, they may be arranged such that the metallic components are further reliably prevented from being brought into contact with each other, or such that the cable ends 24a, 24b are further reliably prevented from coming out while the insertion of the cable ends 24a, 24b is being allowed.

Further, in the present embodiment, the pull rod 16 transmitting the tensile force for activating the parking brake is connected to the equalizer 10, and the pull rod 16 is arranged to pass through the inside of the U-shape of the main body 12 and project out from the opening of the main body 12. Further, the synthetic resin member 14 is bent to have the U shape conforming to the U shape of the main body 12, and is provided with the mutually parallel flat plate portions 50, 52 which are interposed between the lower and upper plates 18, 20 of the main body 12 and the pull rod 16, thereby making it possible to prevent contact between the lower and upper plates 18, 20 and the pull rod 16 which are made of metallic materials and to accordingly satisfactorily prevent generation of a noise arising from the contact between the metallic components during running of the vehicle.

Further, in the present embodiment, the synthetic resin member 14 is integrally provided with the pair of mutually parallel positioning plate portions 56a, 56b for positioning the T-shaped head portion 40 of the pull rod 16 within the recesses 38, and each of the positioning plate portions 56a, 56b is integrally provided with the engaging pawls 58a, 58b for inhibiting the head portion 40 from coming out of the recesses 38. Thus, simply by inserting the head portion 40 into a space between the pair of positioning plate portions 56a, 56b while causing the engaging pawls 58a, 58b to be elastically deformed, the engagement of the pull rod 16 with the equalizer 10 can be satisfactorily maintained, whereby the operation to fix the pull rod 16 in the equalizer 10 is made easy.

Next, there will be described other embodiments of the present invention. In the following embodiments, the same reference signs as used in the above-described embodiment will be used to identify the substantially common parts, and description of these parts will not be provided.

Figure 9A:
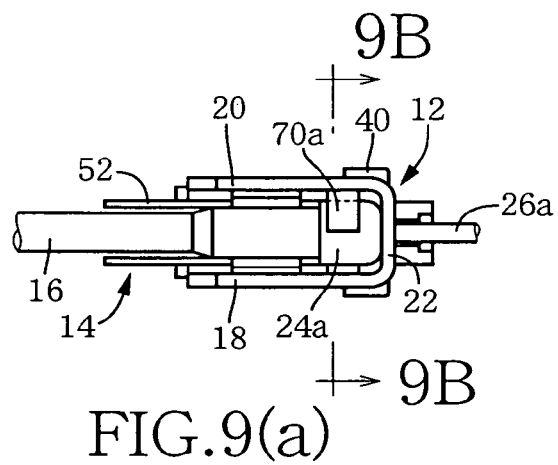
FIG. 9(a) is a front view explaining another embodiment of the present invention.
Figure 9B:
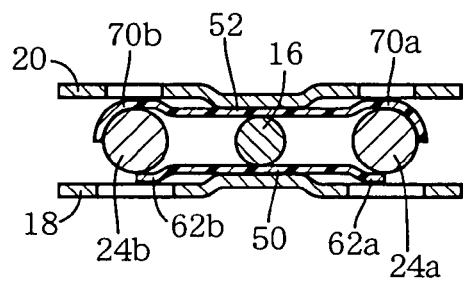
FIG. 9(b) is a cross sectional view explaining the other embodiment of the present invention, taken along line 9B-9B of FIG. 9(a).

FIG. 9(a) is a view corresponding to the FIG. 1. FIG. 9(b) is a cross sectional view taken along line 9B-9B of FIG. 9(a). In this embodiment, the flat plate portion 52 positioned on side of the upper plate 20 has contact preventing portions 70a, 70b which are provided to have an arcuate shape extending along outer circumferential surfaces of the cable ends 24a, 24b. In this arrangement, movements of the cable ends 24a, 24b in horizontal directions, i.e., in right and left direction as seen in FIG. 9(b) are restrained by the contact preventing portions 70a, 70b, whereby generation of a noise as a result of vibrations of the vehicle can be further satisfactorily prevented.

Figure 10A:
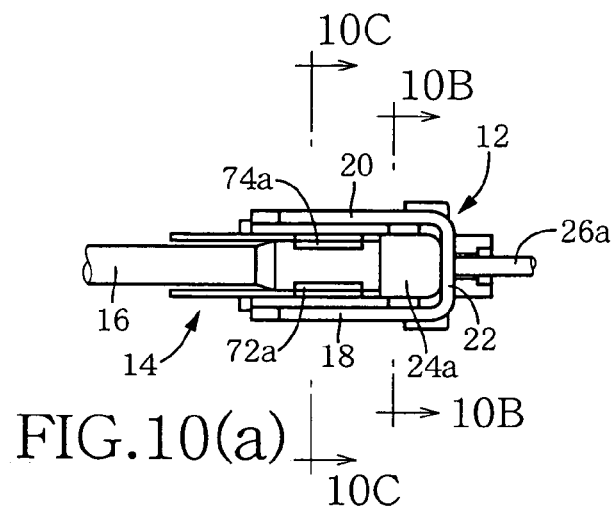
FIG. 10(a) is a front view explaining still another embodiment of the present invention.
Figure 10B:
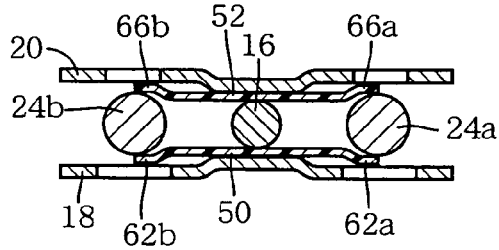
FIG. 10(b) is a cross sectional view explaining the other embodiment of the present invention, taken along line 10B-10B of FIG. 10(a).
Figure 10C:
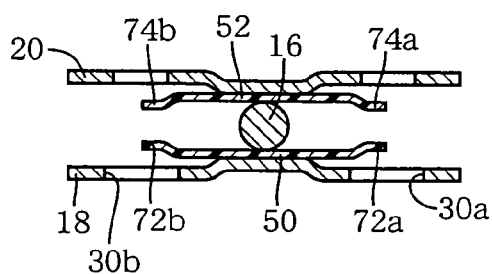
FIG. 10(c) is a cross sectional view explaining the other embodiment of the present invention, taken along line 10C-10C of FIG. 10(a).

FIG. 10(a) is a view corresponding to the FIG. 1. FIG. 10(b) is a cross sectional view taken along line 10B-10B of FIG. 10(a). FIG. 10(c) is a cross sectional view taken along line 10C-10C of FIG. 10(a). This embodiment is the same as the above-described embodiment with respect to the contact preventing portions 62a, 62b, 66a, 66b, but is different from the above-described embodiment with respect to gate portions 72a, 72b and projecting portions 74a, 74b which are bent toward the inside of the U shape of the main body 12 so as to be brought in proximity with each other. That is, each of the gate portions 72a, 72b projecting within the respective inserting holes 30a, 30b has a distal end portion which is bent in a direction of insertion of a corresponding one of the cable ends 24a, 24b into a corresponding one of the inserting holes 30a, 30b. In this arrangement, an amount of the deformation of each of the gate portions 72a, 72b, upon insertion of a corresponding one of the cable ends 24a, 24b into a corresponding one of the inserting holes 30a, 30b, can be reduced, whereby the insertion can be made with a reduced pressing force, thereby further facilitating the operation to fix the cable ends 24a, 24b into the equalizer 10.

When the cable ends 24a, 24b are inserted into the respective inserting holes 30a, 30b with the gate portions 72a, 72b being elastically deformed, the projecting portions 74a, 74b are also elastically deformed. However, at least in a state in which the cable ends 24a, 24b have been moved toward the back plate 22 and seated in the respective engaging holes 28a, 28b, the projecting portions 74a, 74b as well as the gate portions 72a, 72b restore their original shapes as shown in FIG. 10(c). Therefore, if the cable ends 24a, 24b are moved backward in the leftward direction as seen in FIG. 10(a), they are brought into abutting contact with the gate portions 72a, 72b and the projecting portions 74a, 74b, so that further backward movement of the cable ends 24a, 24b is inhibited whereby the cable ends 24a, 24b can be prevented from coming out through the respective inserting holes 30a, 30b.

Figure 11A:
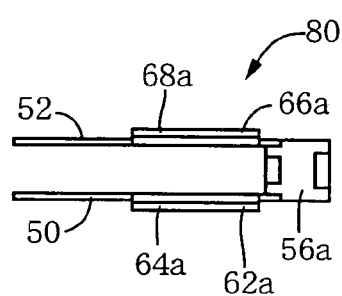
FIG. 11(a) is a front view showing a synthetic resin member of still another embodiment of the present invention.
Figure 11B:
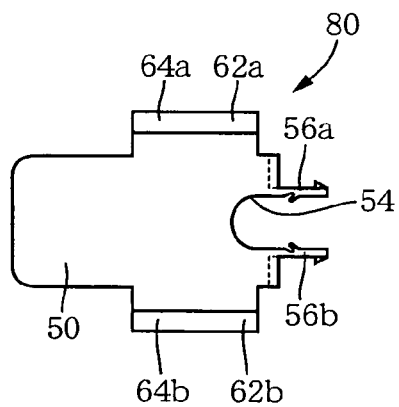
FIG. 11(b) is a bottom view showing the synthetic resin member of the other embodiment of the present invention.

FIGS. 11(a) and 11(b) shows a synthetic resin member 80 which is used in place of the above-described synthetic resin member 14. FIG. 11(a) is a front view, while FIG. 11(b) is a bottom view. In this synthetic resin member 80, each of the contact preventing portions 62a, 62b and a corresponding one of the gate portions 64a, 64b are integrally provided to be contiguous to each other, while each of the contact preventing portions 66a, 66b and a corresponding one of the projecting portions 68a, 68b are integrally provided to be contiguous to each other. This arrangement is of an embodiment of the invention, too.

The embodiments of the present invention have been explained in detail with reference to the drawings. However, the explained embodiments are merely embodied forms, and the present invention can be embodied with various modifications and improvements on the basis of knowledge of those skilled in the art.

The invention claimed is:

1. A parking brake equalizer comprising a pair of engaging portions held in engagement with a pair of output members connected to braking devices of right and left wheels, disposed symmetrically on opposite sides of an input portion, such that the braking devices are activated when the parking brake equalizer pulls the pair of output members while being rockable about the input portion, upon application of a tensile force to the input portion for activating the parking brake, said equalizer comprising:
    a main body including a pair of mutually parallel side plates and a back plate connecting the side plates, defining a structure having substantially a U shape, and accommodating the pair of output members in an interior of the U-shaped structure; and
    a synthetic resin member disposed in the interior of the U-shaped structure,
    wherein the main body has:
    a pair of engaging holes provided in the back plate, allowing connecting members connecting the output members and the braking devices, to extend away from the main body, while inhibiting the output members from passing therethrough;
    a pair of inserting holes which are provided in one of the pair of side plates so as to correspond to the pair of engaging holes, such that the pair of output members are insertable to the interior of the U-shaped structure of the main body through the inserting holes; and
    a pair of slits which are provided to extend between the one of the pair of side plates and the back plate and to connect the inserting holes and the engaging holes, for enabling the connecting members to be insertable through the slits,
    wherein the engaging portions are defined by portions of the back plate in which the engaging holes are provided,
    and wherein the synthetic resin member comprises:
    contact preventing portions interposed between the output members and the pair of side plates, so as to prevent contact between the output members and the side plates; and
    a pair of gate portions projecting within the pair of inserting holes, elastically deformable to allow insertion of the output members through the gate portions, while restoring original shapes thereof to prevent the output members from coming out through the inserting holes, at least in a state wherein the output members have been moved toward the back plate and seated in the engaging holes.

2. The parking brake equalizer according to claim 1, wherein the synthetic resin member has a cutout provided between each of the contact preventing portions and a corresponding one of the gate portions, each of the gate portions being elastically deformable independently of a corresponding one of the contact preventing portions.

3. The parking brake equalizer according to claim 2, wherein each of the gate portions projecting within a corresponding one of the inserting holes has a distal end portion bent toward the inside of the U-shaped structure in a direction corresponding to one of the output members in the interior of the U-shaped structure through a corresponding one of the inserting holes.

4. The parking brake equalizer according to claim 1, further comprising a pull rod transmitting the tensile force to the input portion,
    wherein the back plate of the main body is cutout in a central portion thereof between the pair of engaging holes, while each of the pair of side plates is provided with a recess as the input portion,
    wherein the pull rod includes, in an end portion thereof, a T-shaped head portion held in engagement with the recess, while the pull rod is arranged to project out through an opening of the U-shaped structure of the main body,
    and wherein the synthetic resin member has substantially a U shape conforming to the U shape of the main body structure, and includes mutually parallel flat plate portions which are interposed between the pair of side plates of the main body and the pull rod.

5. The parking brake equalizer according to claim 4, wherein the synthetic resin member includes a pair of mutually parallel positioning plate portions positioning the head portion of the pull rod within the recess,
    and wherein each of the positioning plate portions includes an engaging pawl which projects inwardly from the each of the positioning plate portions, and which is elastically deformable to allow passage of the head portion toward the recess, while restoring an original shape thereof to inhibit movement of the head portion in an opposite direction causing the head portion to come out of the recess after the head portion has been brought into contact with the recess.

* * * * *